United States Patent [19]

Ebata et al.

[11] 4,447,283

[45] May 8, 1984

[54] ADHESIVE FOR CERAMIC ARTICLES AND METHOD FOR ADHESION THEREOF

[75] Inventors: Yoshihiro Ebata, Kawanishi; Saburo Kose, Ikeda; Ryozo Hayami, Takarazuka, all of Japan

[73] Assignees: Agency of Industrial Science and Technology; Ministry of International Trade and Industry, both of Tokyo, Japan

[21] Appl. No.: 418,753

[22] Filed: Sep. 16, 1982

[30] Foreign Application Priority Data

Mar. 4, 1982 [JP] Japan .................................. 57-34558
Mar. 4, 1982 [JP] Japan .................................. 57-34559

[51] Int. Cl.$^3$ ............................................... C09J 1/00
[52] U.S. Cl. ...................................... 156/325; 65/23; 65/43; 106/1.25; 106/286.6; 106/286.7; 156/89; 156/155; 156/283; 156/629; 428/446; 428/688; 428/689; 428/697; 428/698; 428/702; 501/144; 501/151; 501/152
[58] Field of Search ................. 156/89, 325, 155, 629, 156/283; 501/144, 151, 152; 106/1.25, 286.6, 286.7; 65/23, 43; 428/446, 697, 688, 698, 689, 702, 307.7, 312.6, 317.7, 539.5; 29/423, 424

[56] References Cited

U.S. PATENT DOCUMENTS

| 2,548,344 | 4/1951 | Buerger et al. | 428/689 |
| 3,189,512 | 6/1965 | Stong | 156/325 |
| 3,325,266 | 6/1967 | Stong | 156/89 |
| 3,331,731 | 7/1967 | Bååk | 428/697 |
| 4,055,451 | 10/1977 | Cockbain et al. | 428/698 |

Primary Examiner—John J. Gallagher
Attorney, Agent, or Firm—Kurt Kelman

[57] ABSTRACT

An adhesive having as its active component at least one fluoride selected from the group consisting of alkali metal fluorides except for sodium fluoride and alkaline earth metal fluorides except for calcium fluoride or a combination of the aforementioned at least one fluoride with kaolin and an adhesive having as its active component a combination of at least one member selected from the group consisting of yttria and alkaline earth metal compounds except for fluorides, an alkali metal fluoride, and at least one member selected from the group consisting of kaolin and alkaline earth metal fluorides both provide fast adhesion easily between two ceramic articles by a method which comprises the steps of interposing the adhesive between the ceramic articles and heating the ceramic articles with the adhesive therebetween to a temperature equal to or higher than the decomposition temperature of the fluoride in the adhesive.

2 Claims, No Drawings

ADHESIVE FOR CERAMIC ARTICLES AND METHOD FOR ADHESION THEREOF

BACKGROUND OF THE INVENTION

This invention relates to an adhesive for ceramic articles and to a method for the adhesion of such articles, and more particularly to an adhesive advantageously useful for mutual adhesion of ceramic articles of nonoxide type materials such as silicon nitride, silicon carbide, and sialon or for adhesion of ceramic articles of such nonoxide type materials to ceramic articles of other materials and to a method for the adhesion of such articles.

Ceramic articles of nonoxide type materials such as silicon carbide, silicon nitride, and sialon excel particularly in strength at elevated temperatures, resistance to thermal shocks, and resistance to chemicals. By reason of these outstanding properties, they have come to attract keen attention as new high-temperature refractories dissimilar to ceramic articles of metal oxide type materials. Efforts are being continued for the development of new uses for the ceramic articles in various fields. For example, studies are being made to explore the feasibility of these ceramic materials in applications to high-temperature machines and implements, high-precision machine parts, heat exchangers, etc., to ceramic parts destined to be heated instantaneously to high temperatures, and to special high-temperature insulators.

For the ceramic articles of such nonoxide type materials to be advantageously utilized and enabled to manifest their characteristic properties to a full extent while in use, it is often necessary that their mutual adhesion or their adhesion to some other materials should be made while various machines and instruments and their parts which use such ceramic particles are in the course of fabrication. Development of a technique which provides ready and perfect adhesion even for ceramic articles of nonoxide type material finished in various shapes, therefore, is an indispensable requirement.

The ceramic articles of nonoxide type materials, however, have very poor affinity or wetting property generally for molten materials and, unlike the ceramic articles of metal oxide type materials such as alumina and magnesia, show a strong covalent bond property, offer very low reactivity with other chemicals and, moreover, possess a very small thermal expansion coefficient which is less than half the thermal expansion coefficient of alumina. Owing to these unfavorable attributes, adhesion of such articles is extremely difficult. In fact, the adhesion of ceramic articles of nonoxide type materials used to be performed solely by the hot press process involving application of very high levels of temperature and pressure until the methods described afterwards were introduced to the art. Since the hot press process must be operated under high temperature and high pressure, it can provide effective adhesion for ceramic articles of large sizes and complicated shapes only with extreme difficulty. Even if their adhesion is obtained, the adhesive strength with which they are held together is not entirely sufficient.

In view of the state of affairs described above, the inventors conducted research with a view to providing a novel adhesive capable of joining large ceramic articles of complicated shape with ample strength easily under mild conditions without resorting to the hot press method and a method for adhesion by the use of the adhesive.

Recently, an invention was perfected by some of the inventors of the present invention. This has been granted patent under U.S. Pat. No. 4,163,074 and 4,269,641 and is covered by Japanese Patent Application SHO 56(1981)-131683 (U.S. Pat. Application Ser. No. 407352) and SHO 56(1981)-194867 (U.S. Pat. Application Ser. No. 415,476).

U.S. Pat. No. 4,163,074 discloses a method which provides mutual adhesion of nitride ceramic articles by the steps of interposing a mixture of copper sulfide with kaolin intimately between the nitride ceramic articles, heating the joined nitride ceramic articles in a nitrogen-containing atmosphere, then overcoating the thermally treated ceramic articles with silver carbonate, and again heating them in a nitrogen-containing atmosphere.

U.S. Pat. No. 4,269,641 discloses a method for adhesion of two ceramic articles or adhesion of a ceramic article to a copper article. The adhesive used in this method is a paste obtained by mixing powdered CuS, powdered $SiO_2$, and powdered $LaCrO_3$, and blending the resultant mixture with an organic tackifier.

The methods of these U.S. patents have the following shortcomings. The method of U.S. Pat. No. 4,163,074 requires that adhesion be carried out under a high temperature of 1400° C.–1500° C. and a high pressure of 15 kg/cm$^2$ in a vacuum or under an argon atmosphere. On the other hand, U.S. Pat. No. 4,269,641 requires the additional step of applying metal Cu powder to the surface of a mixture of CuS powder, $SiO_2$ powder and $LaCrO_3$ powder.

Japanese Patent Application SHO 56(1981)-131683 (U.S. Pat. Application Ser. No. 407352) covers an invention relating to a method which provides mutual adhesion of ceramic articles of both of silicon nitride by use of calcium fluoride or a mixture of calcium fluoride with kaolin.

The invention of Japanese Pat. Application SHO 56 (1981)-194867 (corresponding to U.S. Pat. Application Ser. No. 415,476) concerns a method which uses calcium fluoride and/or sodium fluoride and kaolin for adhesion of ceramic articles.

The inventors have further continued their study on alkali metal fluorides and alkaline earth metal fluorides except for the aforementioned fluorides and, consequently, found the following facts:

(A) Alkali metal fluorides and alkaline earth metal fluorides other than the aforementioned sodium fluoride and calcium fluoride exhibit similar activities.

(B) When any of the alkali metal fluorides (inclusive of sodium fluoride) is contained as an active component, the temperature of treatment (adhesion) can be lowered in proportion as the content of the alkali metal fluoride increases. Although having this great advantage, the adhesive layer produced tends to sustain minute pinholes to some extent and, depending on the particular place at which the product of adhesion is used, it is not necessarily impossible that these pinholes will have adverse effects unexpectedly upon the product of adhesion.

(C) The occurrence of such pinholes as mentioned above can be efficiently precluded by incorporation of at least one member selected from yttria and alkaline earth metal compounds.

This invention is based on this new discovery mentioned. Thus, it provides an adhesive which is effective in providing fast adhesion between articles of all kinds of ceramics, particularly nonoxide type ceramics, and suitable for a wide range of applications, and a method for the manufacture of this adhesive.

SUMMARY OF THE INVENTION

To accomplish the objects described above, this invention provides:

an adhesive which has, as its active component, either at least one fluoride selected from the group consisting of alkali metal fluorides except for sodium fluoride and alkaline earth metal fluorides except for calcium fluoride or a combination of the aforementioned at least one fluoride with kaolin, and an adhesive which has, as its active component, a combination of at least one member selected from the group consisting of yttria and alkaline earth metal compounds except for fluorides, and an alkali metal fluoride and which optionally further incorporates therein at least one member selected from the group consisting of kaolin and alkaline earth metal fluorides.

The method of this invention for the adhesion of two ceramic articles is characterized by the steps of interposing the aforementioned adhesive between the opposed surfaces of two nonoxide type ceramic articles, two oxide type ceramic articles, or one nonoxide type ceramic article and one oxide type ceramic article, and heating the ceramic articles with the adhesive therebetween at a temperature equivalent to or exceeding the decomposition temperature of the fluoride used as an active component in the adhesive.

The other objects and features of this invention will become apparent from the further disclosure of the invention to be made hereinbelow.

DESCRIPTION OF THE PREFERRED EMBODIMENTS

The adhesive of this invention occurs in the following two types: (1) One type contains as an active component thereof at least one member selected from the group consisting of alkali metal fluorides except for sodium fluoride and alkaline earth metal fluorides except for calcium fluoride and (2) the other type contains as an active component thereof a mixture of at least one member selected from the group consisting of yttria and alkaline earth metal compounds except for fluorides, and an alkali metal fluoride. Optionally, the adhesive of the first type (1) may further incorporate therein kaolin and that of the second type (2) kaolin and/or an alkaline earth metal fluoride.

Examples of the alkali metal fluoride advantageously used as an active component in the adhesive of this invention include lithium fluoride, potassium fluoride, and rubidium fluoride and examples of the alkaline earth metal fluoride similarly used include beryllium fluoride, magnesium fluoride, strontium fluoride, and barium fluoride.

In the case of the active component indicated in (2) above, there may be additionally incorporated sodium fluoride as an alkali metal fluoride and calcium fluoride as an alkaline earth metal fluoride. Although the purity of these fluorides is not specifically defined herein, it is desired to be as high as possible in order that the produced adhesive may acquire as high adhesive strength as possible. To be specific, the purity is desired to be at least 95%.

Concrete examples of the alkaline earth metal compound advantageously used in the adhesive of this invention include oxides such as calcium oxide, magnesium oxide, beryllium oxide, barium oxide, strontium oxide, and carbonates such as calcium carbonate, magnesium carbonate, beryllium carbonate, barium carbonate, and strontium carbonate.

The alkali metal fluoride, alkaline earth metal fluoride, yttria, and the alkaline earth metal compound which form the active components for the two types of adhesives of this invention are advantageously used in their powdered forms in which the compounds are generally available in the market. For additional incorporation in the adhesive, kaolin of any of the grades available in the market may be adopted. It is not limited by its origin (type of ore), size of crystals, history, etc. As concerns composition, kaolin may consist preponderantly of $SiO_2$ and $Al_2O_3$ and additionally contain $Fe_2O_3$, $TiO_2$, $CaO$, $K_2O$, etc. severally in small amounts. The rise in the purity of kaolin tends to increase the adhesive strength of the produced adhesive and enhance the physical properties of the formed adhesive layer as well.

As a sole active component in the adhesive of the type (1) above, there may be used one member which is selected from among the alkali metal fluorides and the alkaline earth metal fluorides defined above to suit the particular purpose for which the produced adhesive will be used. When a mixture of two or more members is preferred to be used as the active component, such members may be freely selected from among those fluorides mentioned above and they may be mixed in a ratio again selected freely (generally in the range of 2 : 8 to 8 : 2) to suit the particular use for which the produced adhesive is intended. When lithium fluoride and potassium fluoride are adopted among other alkali metal fluorides, they are desired to be used in combination with kaolin and/or an alkaline earth metal fluoride.

Kaolin is incorporated in the active component in an amount of 0 to about 90% by weight based on the combined amount of the active component in the adhesive. When it is added to the alkali metal fluoride and/or alkaline earth metal fluoride, it manifests a function of enhancing the adhesive effect of the alkali metal fluoride and/or alkaline earth metal fluoride and improving the physical properties of the formed adhesive layer. Such operation and effect of kaolin gradually improve in proportion as the amount of kaolin added increases. If the added amount of kaolin is increased excessively, however, there may ensue a possibility that excess kaolin will partially separate and persist in the adhesive layer and impair the adhesion produced. When kaolin is incorporated in the active component, therefore, the amount thereof may fall in the range of from about 1% to about 90% by weight.

The amounts of the compounds which compose the active component in the adhesive of the type of (2) mentioned above are not specifically defined. These compounds may be used in any desired proportions. Generally in the active component, the amount of at least one member selected from the group consisting of yttria and alkaline earth metal compounds is in the range of 20 to 80% by weight, the amount of an alkali metal fluoride in the range of 20 to 80% by weight, and the amount of at least one member selected from the group consisting of kaolin and an alkaline earth metal fluoride in the range of 0 to 60% by weight.

The adhesive of this invention provides fast adhesion between two ceramic articles both of the nonoxide type, between two ceramic articles both of the oxide type, or between one ceramic article of the nonoxide type and one ceramic article of the oxide type by a simple procedure of interposing the adhesive between the opposed surfaces of the two ceramic articles and heating the ceramic articles with the adhesive therebetween to a temperature generally in the range of about 1000° to 1500° C., preferably about 1050° to 1400° C. in the case of the adhesive of the type (1) or to a temperature generally in the range of about 1000° to 1500° C., preferably about 1000° to 1300° C. in the case of the adhesive of the type (2) without requiring any application of pressure. Particularly the adhesive of the type (2) is characterized by producing absolutely no pinholes in the formed adhesive layer. If the aforementioned heating is made to a temperature not reaching the lower limit mentioned above, no adhesion is effected because the fluoride is not decomposed. If this heating is continued to a temperature exceeding the upper limit, the excess heat is wasted. As the proportion of the alkali metal fluoride to the adhesive as a whole increases, the temperature of the effective heating for adhesion is lowered within the range mentioned above.

The adhesive of the present invention particularly features an ability to provide fast adhesion between two ceramic articles of the nonoxide type. This adhesion is generally effected with strength well exceeding 400 kg/cm$^2$. In fact, the adhesive strength is as high as 1000 kg/cm$^2$ in the case of the adhesive of the type (1) and 600 kg/cm$^2$ in the case of the adhesive of the type (2). When an adhesive using $ZrSiO_4$ is applied in the oxide form by the hot press method, the adhesive strength exhibited by the formed adhesive layer is about 0.36 kg/mm$^2$. When an adhesive using $ZrO_2$ is applied under vacuum by the hot press method, the adhesive strength exhibited is about 7 kg/cm$^2$. The highest adhesive strength that has heretofore been obtained is about 300 kg/cm$^2$. As compared with this level, the adhesive strength offered by the adhesive of this invention represents an increase of about 30% up to 200 to 300%. Further, the adhesive of this invention can be applied to adhesion between nonoxide type ceramic articles of large size and complicated shape. It provides powerful adhesion of such ceramic articles. Moreover, the adhesive layer to be formed of the adhesive of this invention between the ceramic articles enjoys chemical stability and possesses degrees of resistance to heat and thermal shocks substantially equal to those of ceramic articles of nonoxide type materials.

The reason for the outstanding effects which are produced by the adhesive of this invention remains yet to be elucidated. A logical explanation of these effects may be offered by the following proposition: The alkali fluoride and alkaline earth fluoride in the adhesive of this invention is such that when the adhesive is interposed between the opposed surfaces of two ceramic articles of a nonoxide type material, two ceramic articles of an oxide type material, or one ceramic article of a nonoxide type material and other ceramic article of an oxide type material and then heated to a temperature of not less than the decomposition temperature of the fluoride, the fluoride decomposes with liberation of fluorine gas. It is believed that this liberated fluorine gas will corrode the surfaces of the ceramic materials, while alkali metal and alkaline earth metal as the decomposition product or the reaction product of alkali metal and alkaline earth metal with kaolin will penetrate into the corroded surfaces of the ceramic materials and give rise to an adhesive layer of powerful adhesive strength between the ceramic articles being joined. In case the adhesive of this invention incorporates kaolin in conjunction with the fluoride(s), it is believed that this kaolin will activate the alkali metal or alkaline earth metal produced by the heating and accelerate the penetration of the ceramic materials by sodium or calcium.

In any event, this invention provides a new technique for the adhesion of ceramic articles. Particularly, it has succeeded in establishing a technique for fast adhesion of those ceramic articles of the nonoxide type which have to date defied all attempts to effect their union. In this respect, this invention contributes to enlarging the range of uses found for ceramic articles of the nonoxide type and to further promoting the growth of various industrial branches which require use of high-temperature refractory materials. In the adhesive of the type (2), it is yttria or the alkaline earth metal compound contained in the active component that serves the purpose of precluding otherwise possible occurrence of pinholes in the formed adhesive layer. This relationship has been empirically confirmed.

Examples of the nonoxide type ceramic materials to which the adhesive agent of this invention can be applied are silicon carbide, silicon nitride, and sialon. Here, sialon is a nitride of silicon and aluminum. Examples of the combination of nonoxide type ceramic materials are silicon carbide and silicon carbide, silicon nitride and silicon nitride, silicon nitride and silicon carbide, silicon nitride and sialon, silicon carbide and sialon, and sialon and sialon. The adhesive of this invention can be advantageously used as well for adhesion between ceramic articles of the aforementioned nonoxide materials and ceramic articles of oxide type materials such as, for example, alumina, ceramics of mullite, zirconia, cordierite, beryllia, and magnesia and for mutual adhesion of ceramic articles of the aforementioned oxide type materials.

Optionally, three or more ceramic articles of the aforementioned materials may be piled up one on top of another, with the adhesive of this invention interposed between the adjacent ceramic articles. Particularly when one ceramic article of a nonoxide type material and another ceramic article of an oxide type material, which materials involve a large difference in thermal expansion coefficient, are to be joined, adhesion by the adhesive of this invention may be effectively obtained by interposing therebetween one more ceramic articles of another oxide type material having a thermal expansion coefficient close to the expansion coefficient of the aforementioned ceramic article of nonoxide type material.

By the method of adhesion just mentioned, effective adhesion may be obtained between a ceramic article of a nonoxide type material and a metallic article. To be specific, a metallic article may be joined to a ceramic article of a nonoxide material through the medium of a ceramic article of an oxide type material. In this case, since there is a wide difference of thermal expansion coefficient between the ceramic article of nonoxide material and the metallic article, the ceramic article of oxide type material is interposed therebetween. Use of just one ceramic article of oxide type material will suffice where the thickness of the ceramic article of oxide type material is not more than 5 mm. When the thickness exceeds 5 mm, it is desirable to use at least two ceramic articles of nonoxide type materials of dissimilar thermal expansion coefficients. The metal as referred to herein embraces a wide variety of metals.

These ceramic articles of nonoxide type materials, and oxide type materials and the articles of metallic materials for which the adhesive of this invention are usable are not specifically defined in terms of shape and size. They may be in numerous conceivable shapes such as, for example, plates, pillars, pipes, and solid masses. The ceramic articles to be joined by adhesion may be similar or dissimilar in shape.

The adhesive of this invention may be effectively used in a powdery form in which the compounds composing the active component are simply mixed in their original powdered states. It may be otherwise used in a pasty form which is produced by blending the powdered compound with an ordinary vehicle (such as an organic tackifier like balsam, used alone or in combination with an organic solvent).

Actual use of the adhesive of this invention is accomplished by a procedure of interposing this adhesive between the two ceramic articles subjected to adhesion and subsequently heating the ceramic articles as interposed by the adhesive to a temperature at least not less than the decomposition temperature of the alkali metal fluoride or alkaline earth metal fluoride in the active component of the adhesive. In this procedure, the application of the adhesive between the ceramic articles may be effected by spraying the adhesive on the opposed surfaces of the ceramic articles when the adhesive is in a powdery form or by spreading the adhesive on the opposed surfaces similarly to any ordinary adhesive when the adhesive is in a pasty form. The amount of the adhesive thus applied may be suitably fixed in accordance with the composition of the adhesive, particularly the proportion of kaolin incorporated, the conditions of the heating to be made after the application of the adhesive, the kind and shape, particularly the thickness, of the ceramic materials being treated. Although it is not specifically defined herein, it is desired to fall in the range of about 0.01 to 5 g, preferably about 0.1 to 1 g, of the amount of the active component of the adhesive per $cm^2$ of the surface of adhesion. The heating to be performed after the adhesive has been applied to the surfaces of adhesive as described above can be effectively carried out at a temperature at which the alkali metal fluoride or alkaline earth metal fluoride is decomposed with liberation of fluorine.

During the course of applying heat to the ceramic articles with the adhesive therebetween, this invention does not require adoption of any special means for application of pressure. Optionally, slight pressure may be applied to ensure intimate approximation of the opposed surfaces of adhesion. Generally, the aforementioned heating can be easily carried out in the air. Of course, it may be performed under a blanket of nitrogen gas when there is a possibility that the materials being joined will undergo oxidation on being heated. When the ceramic materials are heated as described above and then allowed to cool off, the adhesive layer formed therebetween keeps them in fast adhesion.

Now, the present invention will be described more specifically below with reference to working examples.

EXAMPLE 1

A mixed powder consisting of 40% by weight of lithium fluoride and 60% by weight of kaolin was interposed by spraying at a rate of 0.5 g per $cm^2$ of area of adhesion between a plate of silicon nitride and a plate of mullite type ceramic (made by Nippon Chemical Ceramics, Ltd.) and a copper plate was superposed on the mullite type ceramic plate. The composite thus formed was placed in an electric furnace and heated at 1100° C. for 20 minutes.

A test piece of the resultant joined plates was tested for adhesive strength by the three-point bending method under the conditions of 20 mm of span and 0.5 mm/min. of load speed. The adhesive strength was 420 kg/$cm^2$. Observation of the surface of the fracture the test piece had sustained during the bending test revealed that the fracture had occurred in a portion (plate of silicon nitride) other than the formed layer of adhesive.

When another test piece of the joined plates was kept immersed in an aqueous 48% potassium hydroxide solution at 70° C. for 50 hours by way of test for resistance to chemicals, absolutely no sign of abnormality was found in or near the area of adhesion.

When the same test piece was heated again to 1100° C. and then cooled suddenly in the air by way of a quenching test to determine resistance to thermal shocks, absolutely no sign of abnormality was found in or near the area of adhesion.

EXAMPLE 2

A mixed powder consisting of 20% by weight of lithium fluoride and 80% by weight of kaolin was interposed by spraying at a rate of 0.5 g per $cm^2$ of surface area of adhesion between a plate of silicon nitride and a plate of mullite type ceramic (Nippon Chemical Ceramics, Ltd.). The composite was placed in an electric furnace and heated at 1350° C. for 20 minutes to join the plates.

When a test piece of the joined plates was tested for adhesive strength, it was found to have 505 kg/$cm^2$ of adhesive strength. When another test piece of the joined plates was tested for resistance to chemicals and resistance to thermal shocks by following the procedure of Example 1, absolutely no sign of abnormality was found.

EXAMPLE 3

Powdered magnesium fluoride was interposed by spraying at a rate of 0.5 g per $cm^2$ of area of adhesion between adjacent plates of a stack consisting of two plates of silicon nitride and a plate of mullite type ceramic (Nippon Chemical Ceramics, Ltd.). The resultant composites were placed in an electric furnace and heated at 1300° C. for 20 minutes to join the plates.

When test pieces of the resultant joined plates were tested for adhesive strength, they were found to possess adhesive strength equal to or greater than the adhesive strength of the joined plates of Example 1. When other test pieces of the joined plates were tested for resistance to chemicals and resistance to thermal shocks by following the procedure of Example 1, absolutely no sign of abnormality was found.

EXAMPLE 4

A mixed powder consisting of 40% by weight of magnesium fluoride and 60% by weight of lithium fluoride was interposed by spraying at a rate of 0.5 g per $cm^2$ of area of adhesion between one plate of silicon nitride and one plate of mullite type ceramic (Nippon Chemical Ceramics, Ltd.) and a copper plate was superposed on the plate of mullite type ceramic. The composite was placed in an electric furnace and heated at 1100° C. for 20 minutes.

When a test piece of the resultant joined plates was tested for adhesive strength, it was found to possess adhesive strength equal to or greater than the adhesive strength of the joined plates of Example 1. When another test piece of the joined plates was tested for resistance to chemicals and resistance to thermal shocks by following the procedure of Example 1, absolutely no sign of abnormality was found.

EXAMPLE 5

A mixed powder consisting of 30% by weight of yttria and 70% by weight of sodium fluoride was interposed by spraying at a rate of 0.5 g per cm$^2$ of area of adhesion between a plate of silicon nitride and a plate of mullite type ceramic (Nippon Chemical Ceramics, Ltd.) and a copper plate was superposed on the plate of mullite type ceramic. The resultant composite was placed in an electric furnace and heated at 1100° C. for 20 minutes.

A test piece of the resultant joined plates was tested for adhesive strength by the three-point bending method under the conditions of 20 mm of span and 0.5 mm/min. of load speed. The adhesive strength was found to be 470 kg/cm$^2$. Observation of the surface of the fracture the test piece had sustained during the bending test revealed that the fracture had occurred in a portion (the plate of mullite type ceramic) other than the formed layer of adhesive.

When another test piece of the joined plates was kept immersed in an aqueous 48% potassium hydroxide at 70° C. for 70 hours by way of test for resistance to chemicals, absolutely no sign of abnormality was found in and near the area of adhesion.

When the same test piece was heated to 1100° C. and then suddenly cooled in the air by way of a quenching test for resistance to thermal shocks, absolutely no sign of abnormality was found in and near the area of adhesion.

EXAMPLES 6-8

Three samples of the adhesive of this invention were prepared by following the procedure of Example 5, except that the mixing ratio of powdered yttria and powdered sodium fluoride was varied. They were each used to join a plate of silicon nitride, a plate of mullite type ceramic, and a plate of copper. By following the procedure of Example 5, test pieces of the joined plates were tested for adhesive strength, resistance to chemicals, and resistance to thermal shocks. The results were as shown in Table 1.

TABLE 1

| Example No. | Yttria (% by weight) | Sodium fluoride (% by weight) | Adhesive strength (kg/cm$^2$) | Resistance to chemicals (48% KOH) | Resistance to thermal shocks (quenching) |
| --- | --- | --- | --- | --- | --- |
| 6 | 40 | 60 | 420 | No abnormality | No abnormality |
| 7 | 50 | 50 | 410 | No abnormality | No abnormality |
| 8 | 60 | 40 | 380 | No abnormality | No abnormality |

EXAMPLE 9

A mixed powder consisting of 30% by weight of yttria and 70% by weight of sodium fluoride was interposed by spraying at a rate of 0.5 g per cm$^2$ of area of adhesion between two plates of silicon nitride. The composite was heated at 1100° C. for 20 minutes by following the procedure of Example 5 to join the plates. When a test piece of the resultant joined plates was tested for adhesive strength, it was found to possess 520 kg/cm$^2$ of adhesive strength. When another test piece of the joined plates was tested for resistance to chemicals and resistance to thermal shocks by following the procedure of Example 5, absolutely no sign of abnormality was found.

EXAMPLES 10-12

Samples of the adhesive of this invention were prepared by repeating the procedure of Example 9, except that the mixing ratio of powdered yttria and powdered sodium fluoride was varied. They were each used to join two plates of silicon nitride similarly. When test pieces of the resultant joined plates were tested for adhesive strength, resistance to chemicals, and resistance to thermal shocks by following the procedure of Example 5, the results were as shown in Table 2.

TABLE 2

| Example No. | Yttria (% by weight) | Sodium fluoride (% by weight) | Adhesive strength (kg/cm$^2$) | Resistance to chemicals (48% KOH) | Resistance to thermal shocks (quenching) |
| --- | --- | --- | --- | --- | --- |
| 10 | 40 | 60 | 470 | No abnormality | No abnormality |
| 11 | 50 | 50 | 420 | No abnormality | No abnormality |
| 12 | 60 | 40 | 405 | No abnormality | No abnormality |

EXAMPLE 13

A plate of silicon nitride and a plate of mullite type ceramic (Nippon chemical Ceramics, Ltd.) were joined with a mixed powder consisting of 70% by weight of calcium oxide and 30% by weight of sodium fluoride by following the procedure of Example 5. By the three-point bending test performed similarly to Example 5, a test piece of the resultant joined plate was found to possess 510 kg/cm$^2$ of adhesive strength. When another test piece of the joined plates was tested for resistance to chemicals and resistance to thermal shocks by following the procedure of Example 5, absolutely no sign of abnormality was found.

EXAMPLES 14-17

Samples of the adhesive of this invention were prepared by following the procedure of Example 13, except that the mixing ratio of calcium oxide and sodium fluoride was varied. They were each used to join a plate of silicon nitride, a plate of mullite type ceramic, and a plate of copper. Test pieces of the resultant joined plates were tested for adhesive strength, resistance to chemicals, and resistance to thermal shocks by following the procedure of Example 5. The results were as shown in Table 3.

TABLE 3

| Example No. | Calcium oxide (% by weight) | Sodium fluoride (% by weight) | Adhesive strength (kg/cm$^2$) | Resistance to chemicals (48% KOH) | Resistance to thermal shocks (quenching) |
| --- | --- | --- | --- | --- | --- |
| 13 | 30 | 70 | 390 | No abnormality | No abnormality |
| 14 | 40 | 60 | 480 | No abnormality | No abnormality |
| 15 | 50 | 50 | 515 | No abnormality | No abnormality |

TABLE 3-continued

| Example No. | Calcium oxide (% by weight) | Sodium fluoride (% by weight) | Adhesive strength (kg/cm$^2$) | Resistance to chemicals (48% KOH) | Resistance to thermal shocks (quenching) |
|---|---|---|---|---|---|
| 16 | 60 | 40 | 505 | No abnormality | No abnormality |

EXAMPLE 18

A mixed powder consisting of 30% by weight of calcium oxide and 70% by weight of sodium fluoride was interposed by spraying at a rate of 0.5 g per cm$^2$ of area of adhesion between two plates of silicon nitride. The resultant composite was heated by following the procedure of Example 5. A test piece of the resultant joined plates was found to possess 560 kg/cm$^2$ of adhesive strength. When another test piece of the joined plates was tested for resistance to chemicals and resistance to thermal shocks, absolutely no sign of abnormality was found.

EXAMPLES 19–21

Samples of the adhesive of this invention were prepared by following the procedure of Example 18, except that the mixing ratio of calcium oxide and sodium fluoride was varied. They were each used to join two plates of silicon nitride. Test pieces of the resultant joined plates were tested for adhesive strength, resistance to chemicals, and resistance to thermal shocks by following the procedure of Example 5. The results were as shown in Table 4.

TABLE 4

| Example No. | Calcium oxide (% by weight) | Sodium fluoride (% by weight) | Adhesive strength (kg/cm$^2$) | Resistance to chemicals (48% KOH) | Resistance to thermal shocks (quenching) |
|---|---|---|---|---|---|
| 19 | 40 | 60 | 490 | No Abnormality | No abnormality |
| 20 | 50 | 50 | 520 | No Abnormality | No abnormality |
| 21 | 60 | 40 | 530 | No Abnormality | No abnormality |

EXAMPLE 22

A mixed powder consisting of 80% by weight of calcium carbonate and 20% by weight of lithium fluoride was interposed by spraying at a rate of 0.5 g per cm$^2$ of area of adhesion between a plate of silicon nitride and a plate of mullite type ceramic and a copper plate was superposed on the plate of mullite type ceramic. The resultant composite was placed in an electric furnace and heated at 1100° C. for 20 minutes.

When a test piece of the resultant joined plates was tested for adhesive strength by following the procedure of Example 5, it was found to possess 550 kg/cm$^2$ of adhesive strength. When another test piece of the joined plates was tested for resistance to chemicals and resistance to thermal shocks by following the procedure of Example 5, absolutely no sign of abnormality was found.

EXAMPLE 23

A test piece of joined plates was prepared by following the procedure of Example 5, except that 40% by weight of sodium fluoride and 30% by weight of kaolin were used instead of 70% by weight of sodium fluoride. When the test piece was tested for adhesive strength, it was found to have 480 kg/cm$^2$ of adhesive strength. Other test results were substantially the same as those in Example 5.

EXAMPLE 24

A test piece of joined plates was prepared by following the procedure of Example 13, except that 40% by weight of calcium oxide and 30% by weight of calcium fluoride were used in place of 70% by weight of calcium oxide. The adhesive strength of the test piece thus obtained was found to be 500 kg/cm$^2$. Other test results were substantially the same as those in Example 13.

What is claimed is:

1. A method for the adhesion of a ceramic article of silicon nitride to an article selected from the group consisting of ceramic articles of silicon nitride and mullite-type ceramic articles, said method comprising interposing between the two ceramic articles an adhesive comprising as active components 40% to 70% by weight of sodium fluoride and 60% to 30% by weight of yttria, and heating said adhesive to a temperature in the range of from about 1000° C. to about 1500° C., thereby adhering the two ceramic articles without forming any pinholes in the formed layer of adhesive.

2. An adhesive for a ceramic article of silicon nitride and an article selected from the group consisting of ceramic articles of silicon nitride and mullite-type ceramic articles and capable of forming a pinhole-free layer of adhesive between said articles, said adhesive comprising as active components 40% to 70% by weight of sodium fluoride and 60% to 30% by weight of yttria.

* * * * *